US008460421B2

(12) United States Patent
Troxell et al.

(10) Patent No.: US 8,460,421 B2
(45) Date of Patent: Jun. 11, 2013

(54) VELOCITY STACK MOUNTED AIR FILTER ASSEMBLY

(75) Inventors: Ronald C. Troxell, Clarendon Hills, IL (US); Robin R. Desai, Glenview, IL (US)

(73) Assignee: R2C Performance Products, LLC., Vernon Hills, IL (US)

( * ) Notice: Subject to any disclaimer, the term of this patent is extended or adjusted under 35 U.S.C. 154(b) by 463 days.

(21) Appl. No.: 12/800,463

(22) Filed: May 14, 2010

(65) Prior Publication Data
US 2011/0277429 A1    Nov. 17, 2011

(51) Int. Cl.
*B01D 46/00*    (2006.01)

(52) U.S. Cl.
USPC ................................ 55/385.3; 55/410; 55/413

(58) Field of Classification Search
USPC ................. 55/385.3, 522–524; 422/169–172, 422/177–182; 123/41.22, 184.53, 198
See application file for complete search history.

(56) References Cited

U.S. PATENT DOCUMENTS

| | | | | |
|---|---|---|---|---|
| 3,796,027 | A * | 3/1974 | Gumtow | 55/502 |
| 4,277,260 | A * | 7/1981 | Browning | 96/426 |
| 5,213,596 | A * | 5/1993 | Kume et al. | 55/481 |
| 5,222,488 | A * | 6/1993 | Forsgren | 128/201.25 |
| 5,554,205 | A * | 9/1996 | Ernst et al. | 55/385.3 |
| 5,725,624 | A * | 3/1998 | Ernst et al. | 55/502 |
| 5,730,768 | A * | 3/1998 | Kaminaga et al. | 55/385.3 |
| 5,989,421 | A * | 11/1999 | Davis et al. | 210/232 |
| 6,890,366 | B2 * | 5/2005 | Bugli et al. | 55/385.3 |
| 7,299,688 | B2 * | 11/2007 | Salvisberg | 73/114.14 |
| 7,556,019 | B2 * | 7/2009 | Jury et al. | 123/391 |
| 7,963,265 | B2 * | 6/2011 | Tassinari et al. | 123/184.56 |
| 7,967,092 | B2 * | 6/2011 | Fujimura | 180/68.3 |
| 2003/0019456 | A1 * | 1/2003 | Ayton | 123/184.21 |
| 2004/0212104 | A1 * | 10/2004 | Peterson | 261/23.2 |
| 2006/0288673 | A1 * | 12/2006 | Wimmer | 55/385.3 |
| 2007/0095323 | A1 * | 5/2007 | Salvisberg | 123/184.53 |
| 2009/0229232 | A1 * | 9/2009 | Hirsch | 55/525 |
| 2010/0147244 | A1 * | 6/2010 | Tassinari et al. | 123/184.56 |

OTHER PUBLICATIONS www.knfilter.com, copyright 2010.
www.knfilter.com/Racing/Injector.htm, copyright 2010.

* cited by examiner

*Primary Examiner* — Duane Smith
*Assistant Examiner* — Amber Orlando
(74) *Attorney, Agent, or Firm* — R. Tracy Crump

(57) ABSTRACT

The air filter assembly or "air box" includes a flat base tray mounted to velocity stacks and a detachable filter box. The base tray includes a number of pliable mounting shoes, which are seated within openings formed in the base tray. The mounting shoes are formed or molded of a pliable synthetic rubber and are configured to have a number of ports through which the velocity stacks extend. Each stack port is defined by a bowl shaped depression that diverges into an annular collar. The base tray is mounted to the velocity stacks by hose clamps that compress the annular collars of the mounting shoes around the stacks. The detachable filter box is held to the base tray by six quick release latches.

8 Claims, 8 Drawing Sheets

VELOCITY STACK MOUNTED AIR FILTER ASSEMBLY

This invention relates to an air filter assembly for combustion engines, and in particular a box-style air filter assembly mountable to the vertical velocity stacks of a fuel injection system on the combustion engines of a vehicle.

BACKGROUND OF THE INVENTION

Box-style air filter assemblies or "air boxes" are commonly used on sprint car engines and other types of performance engines that use fuel injection systems that have multiple vertical "velocity stacks" or "injector tubes." Box-style air boxes are mounted directly to the vertical velocity stacks of fuel injection systems and provide a large volume plenum enclosure that services all the stacks replacing smaller individual filters mounted to each stack.

A conventional air box includes a flat mounting tray which is secured to the velocity stacks and a detachable filter box. Heretofore, holes were manually cut in the flat mounting tray to accept the velocity stacks therethrough. The mounting tray is secured to the stacks by an adhesive sealant along with various clamps, fasteners and other hardware. In addition to holding the mounting tray to the stacks, the adhesives sealants are needed to create a hermetic seal between the mounting tray and the stack, which prevents dust and other debris from entering the air box. The use of adhesive sealants to secure the mounting tray to the stacks makes engine repair and maintenance more difficult and time consuming. Each time the mounting tray is removed from the stack for engine repair or maintenance, the old adhesive and sealant must be cleaned from the stacks before the tray can be reinstalled. The hermetic seal provided by the adhesives and sealants can also deteriorate and become compromised by engine vibrations.

SUMMARY OF THE INVENTION

The present invention seeks to provide an improved air box style assembly that mounts more securely and conveniently to the velocity stacks and ensures a more reliable hermetic seal. The air box includes a flat base tray mounted to velocity stacks and a detachable filter box. The base tray includes a number of pliable mounting shoes, which are seated within openings formed in the base tray. The mounting shoes are formed or molded of a pliable synthetic rubber and are configured to have a number of ports through which the velocity stacks extend. Each stack port is defined by a bowl shaped depression that diverges into an annular collar. The base tray is mounted to the velocity stacks by hose clamps that compress the annular collars of the mounting shoes around the stacks. The detachable filter box, which is constructed from panels of pleated filter material bonded to a light-weight sub-frame, is held to the base tray by quick release latches.

The base tray of this invention can be installed and uninstalled in minutes with simple tools and eliminates the need to use messy and troublesome sealants to mount and seal the air box to the velocity stacks. The mounting shoes are specifically formed or molded, as well as positioned on the base tray, to accommodate the particular style or arrangement of velocity stacks on which the base tray will be mounted. The quick release latches that securely hold the filter box to the base tray allow the filter box to be removed from the base tray in seconds for cleaning or replacement. The quick release also eliminates the need for any tie-rod fasteners extending through the filter box.

The use of the pliable mounting shoes in this invention provides a more reliable and resilient structural interface for mounting the base tray to the velocity stacks. The annular collar of the pliable mounting shoes wrap physically around the velocity stacks and hose clamps securely holds the collar to the stack, which ensures a positive seal between the stacks and base tray, as well as, creating the holding force, which supports the base tray. The bowl shaped depression in the mounting shoes from which the collar diverges helps dampen and isolate the base tray from engine vibrations.

Theses and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

Figure 1:
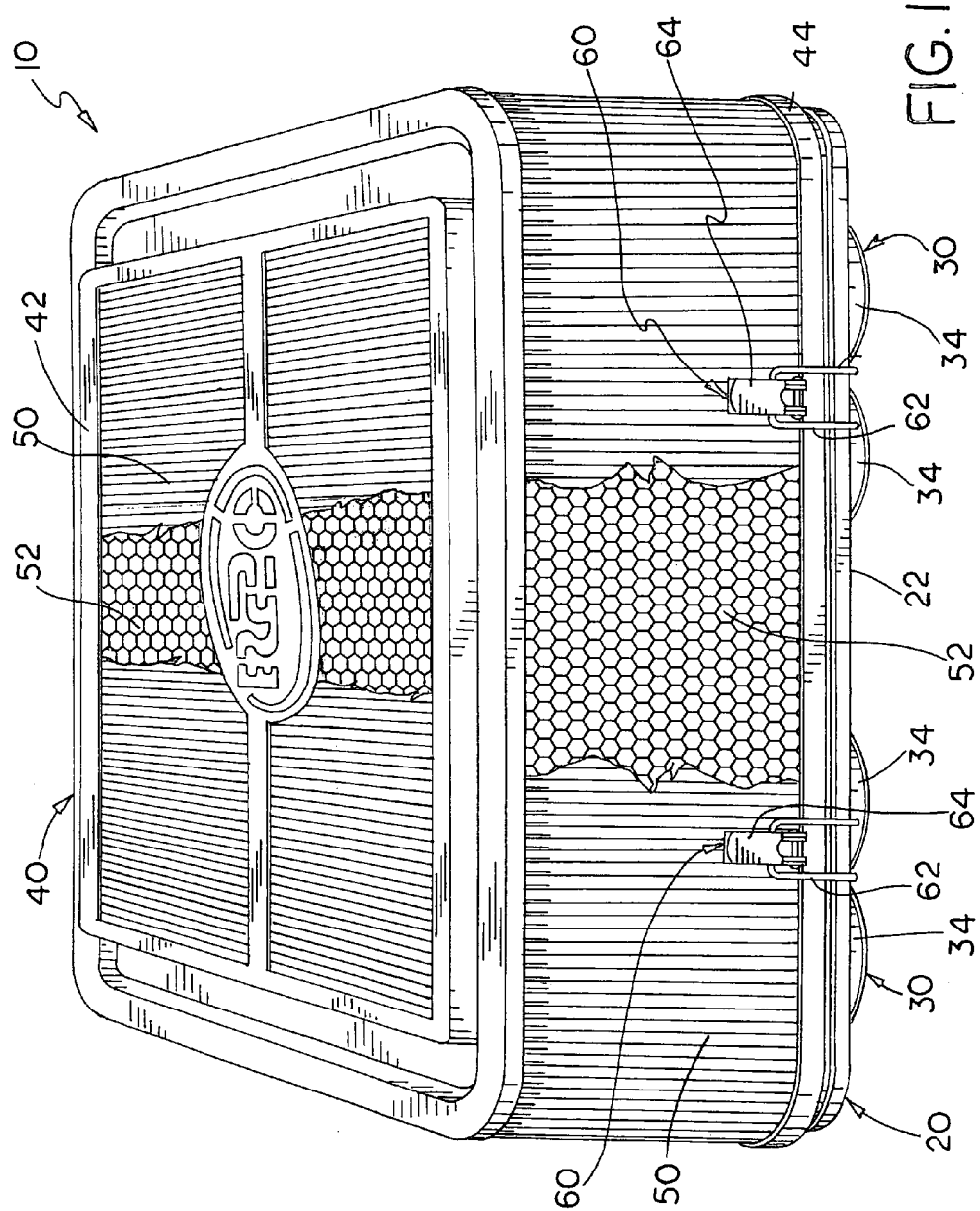
FIG. 1 is a perspective view of an embodiment of the air filter assembly of this invention.
Figure 2:
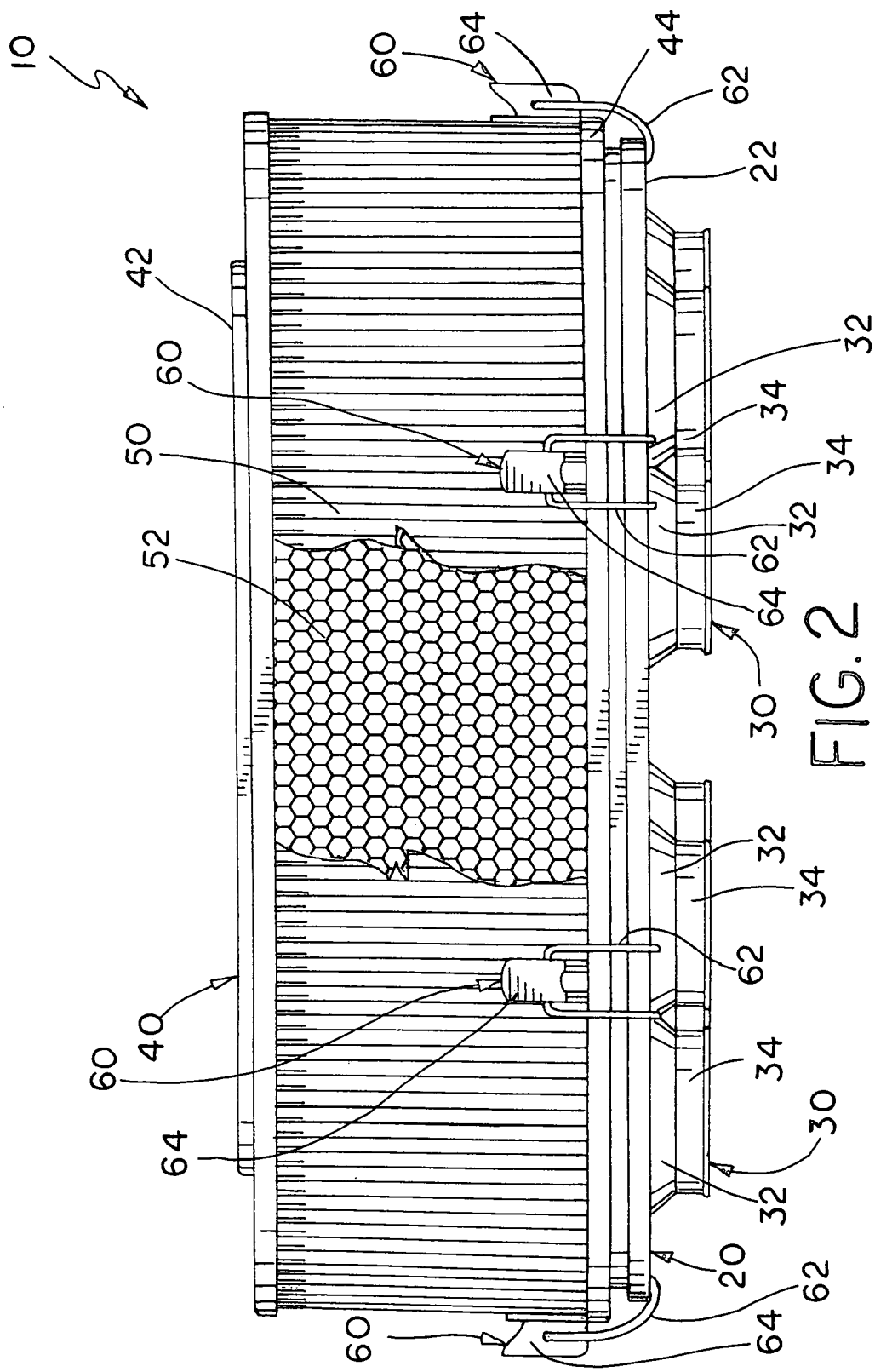
FIG. 2 is side view of the air filter assembly of FIG. 1.
Figure 3:
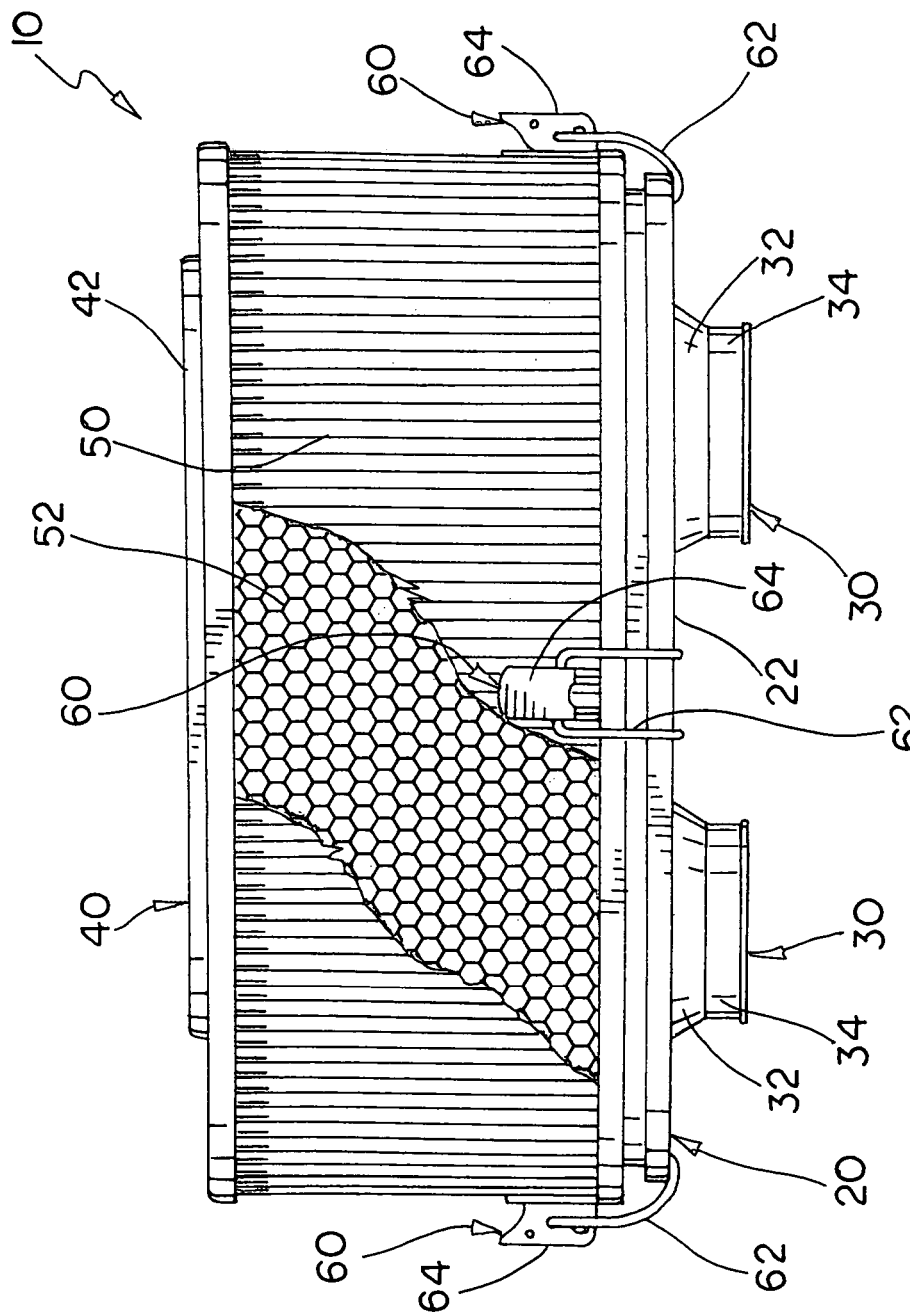
FIG. 3 is an end view of the air filter assembly of FIG. 1.
Figure 4:
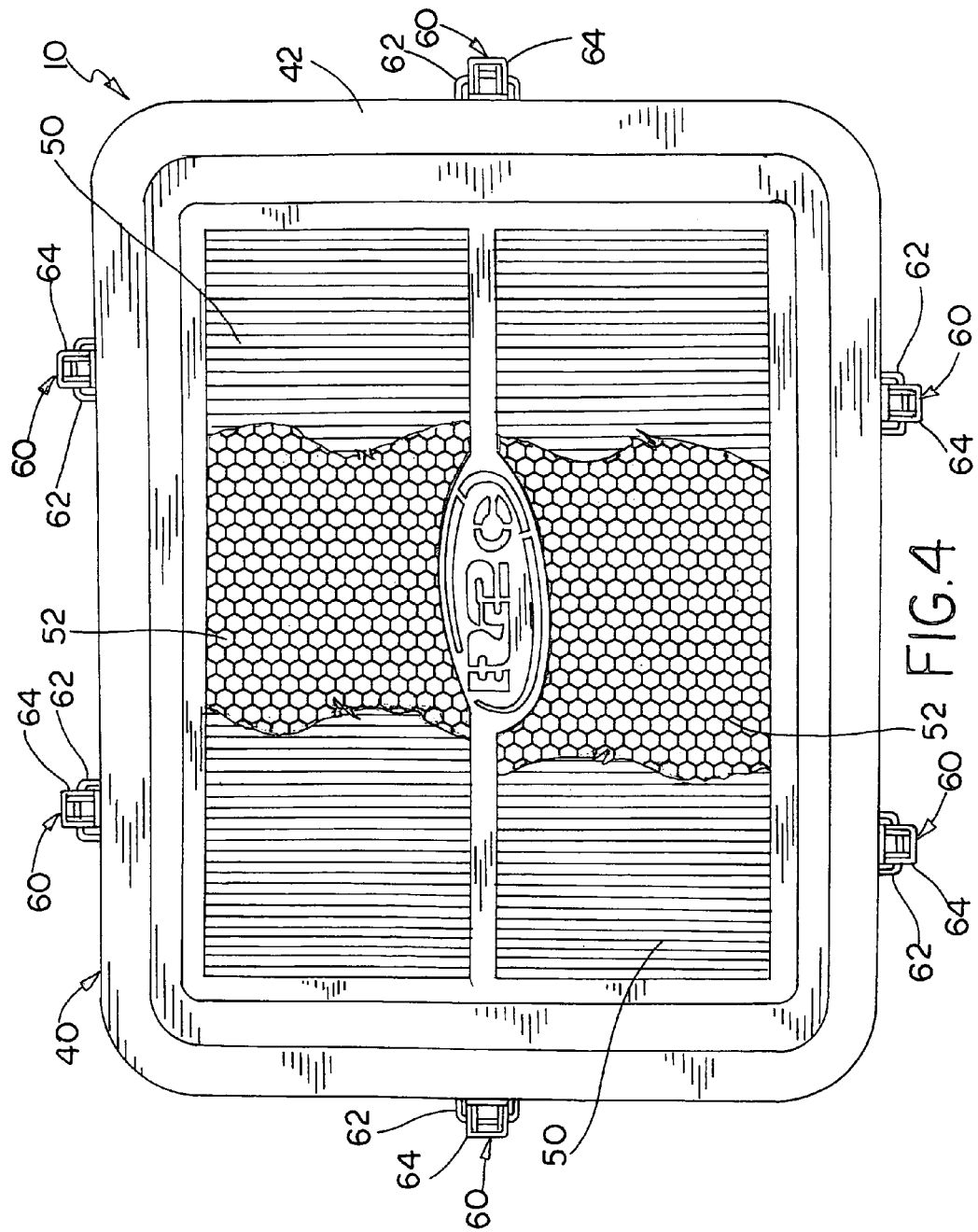
FIG. 4 is a top view of the air filter assembly of FIG. 1.
Figure 5:
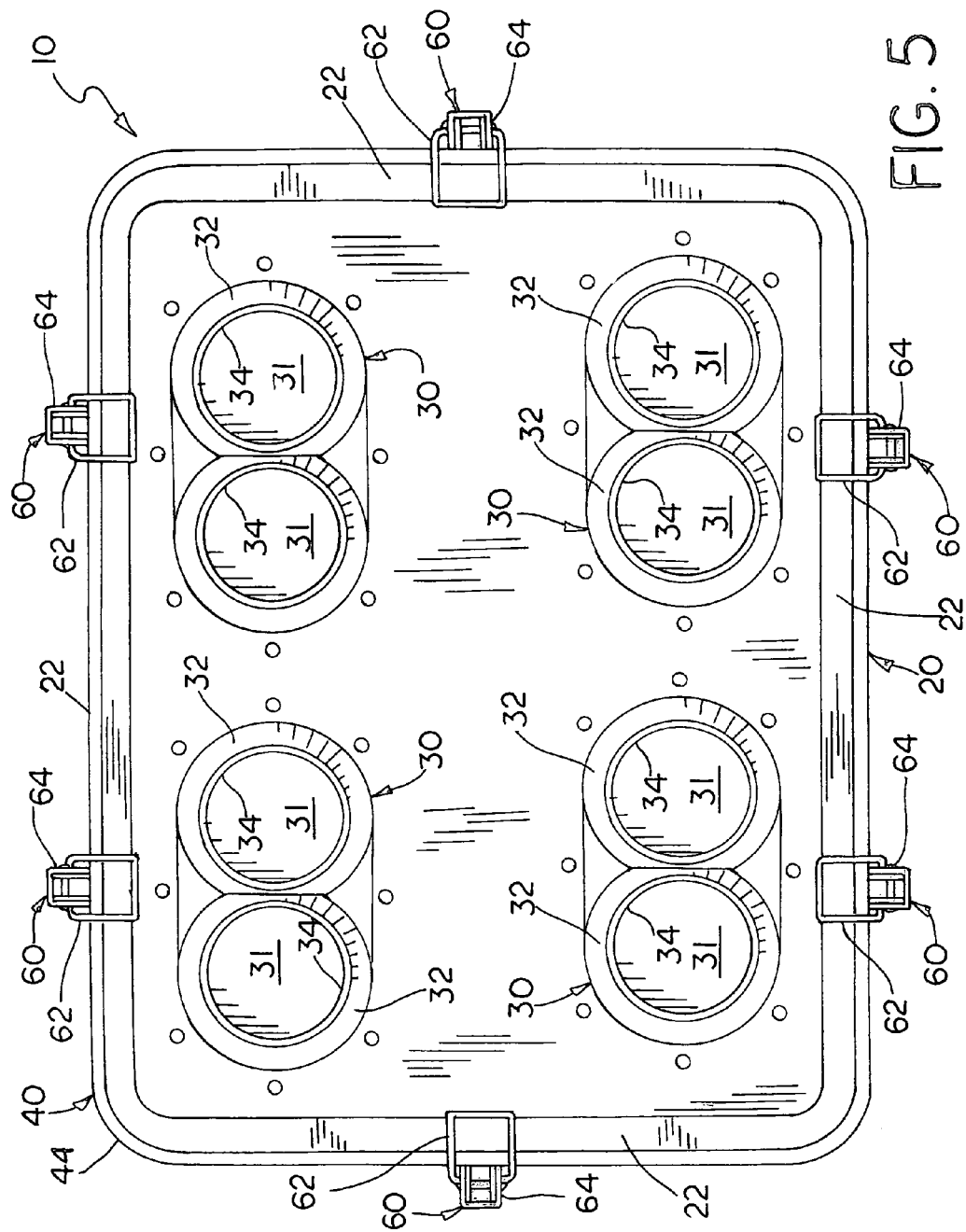
FIG. 5 is bottom view of the air filter assembly of FIG. 1.

Referring now to the drawings, FIGS. 1-8 illustrate an embodiment of the air filter assembly or air box of this invention, which is designated as reference numeral 10. Air box 10 is a box-style air filter assembly designed to mount to the velocity stacks of fuel injection systems on small internal combustion engines. For simplicity of explanation, air box 10 is illustrated in the figures and describe hereafter in use with an injector system having four sets of "Siamese" style velocity stacks 4 (paired injector tubes) that extend vertically from the conventional fuel injector system 3 on a small block V8 engine 2, although the air box of this invention can be modified to accommodate any style or arrangement of velocity stacks within the teachings of this invention.

Figure 6:
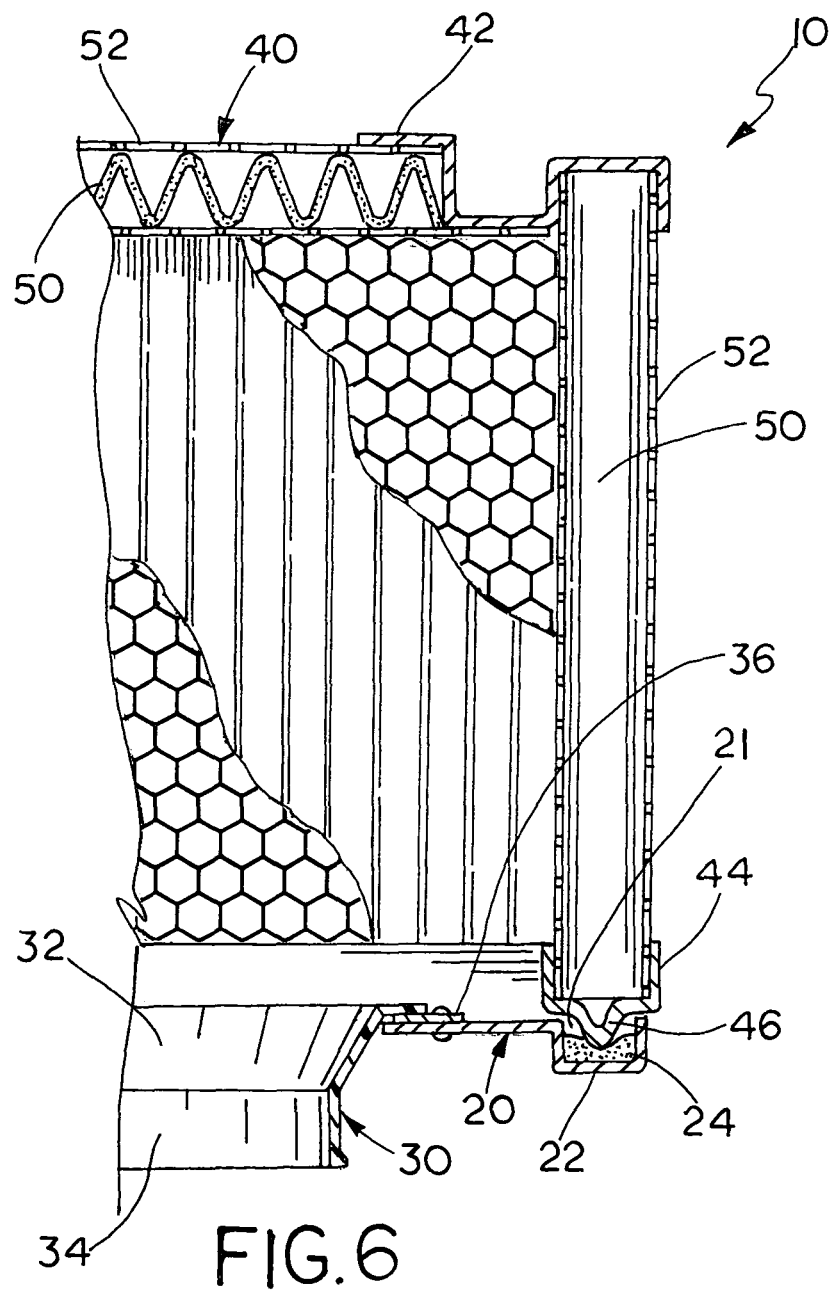
FIG. 6 is a partial sectional view of the air filter assembly of FIG. 1.

As shown, air box 10 includes a flat base tray 20 mounted to velocity stacks 4 and detachable filter box 40. Base tray 20 is constructed of carbon fiber composite, but may be constructed of other light-weight, heat resistant materials. Base tray 20 is substantially flat and has a rectangular shape with rounded ends, which conforms to the shape and size of the filter box 40. As shown in FIG. 6, base tray 20 is formed to have a peripheral U-shaped top channel 21 and a squared bottom shoulder 22. Ideally, gasket 24 is a closed cell memory foam seated within channel 21, which provides a hermetic seal between base tray 20 and filter box 40. Base tray 20 also includes four pliable mounting shoes 30, which are seated within one of four oblong openings 23 formed in base tray 20. Mounting shoes 30 are bonded to base tray 20 within tray openings 23 by a suitable adhesive. Mounting shoes 30 are formed or molded of a synthetic rubber. Each mounting shoe 30 has two stack ports 31 in a figure eight configuration. Each stack port 31 is defined by a bowl shaped depression 32 that diverges into an annular collar 34, which extends below the bottom of base tray 20. Each mounting shoe 30 also includes a rigid reinforcement plate 36, which is integrally formed with or bonded to the peripheral edge of the mounting shoe. Plate 36 is constructed of a light weight material or metal, such as aluminum, plastic or carbon fiber. As shown, reinforcement plate 36 is riveted or screwed to base tray 20 to further secure mounting shoes 30 to the base tray.

Figure 7:
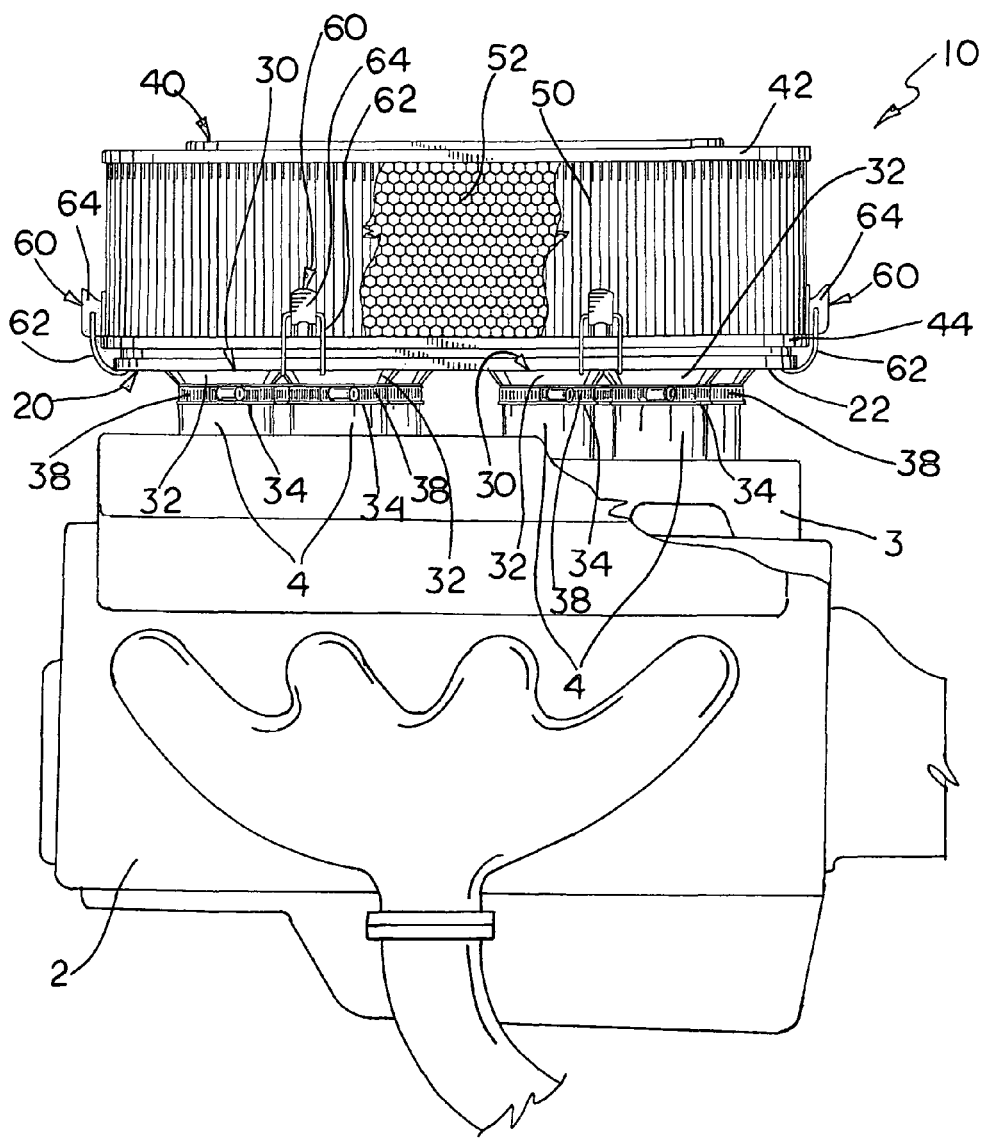
FIG. 7 is a simplified side view of the air filter assembly of FIG. 1 mounted to the injector tubes of a vehicle motor.
Figure 8:
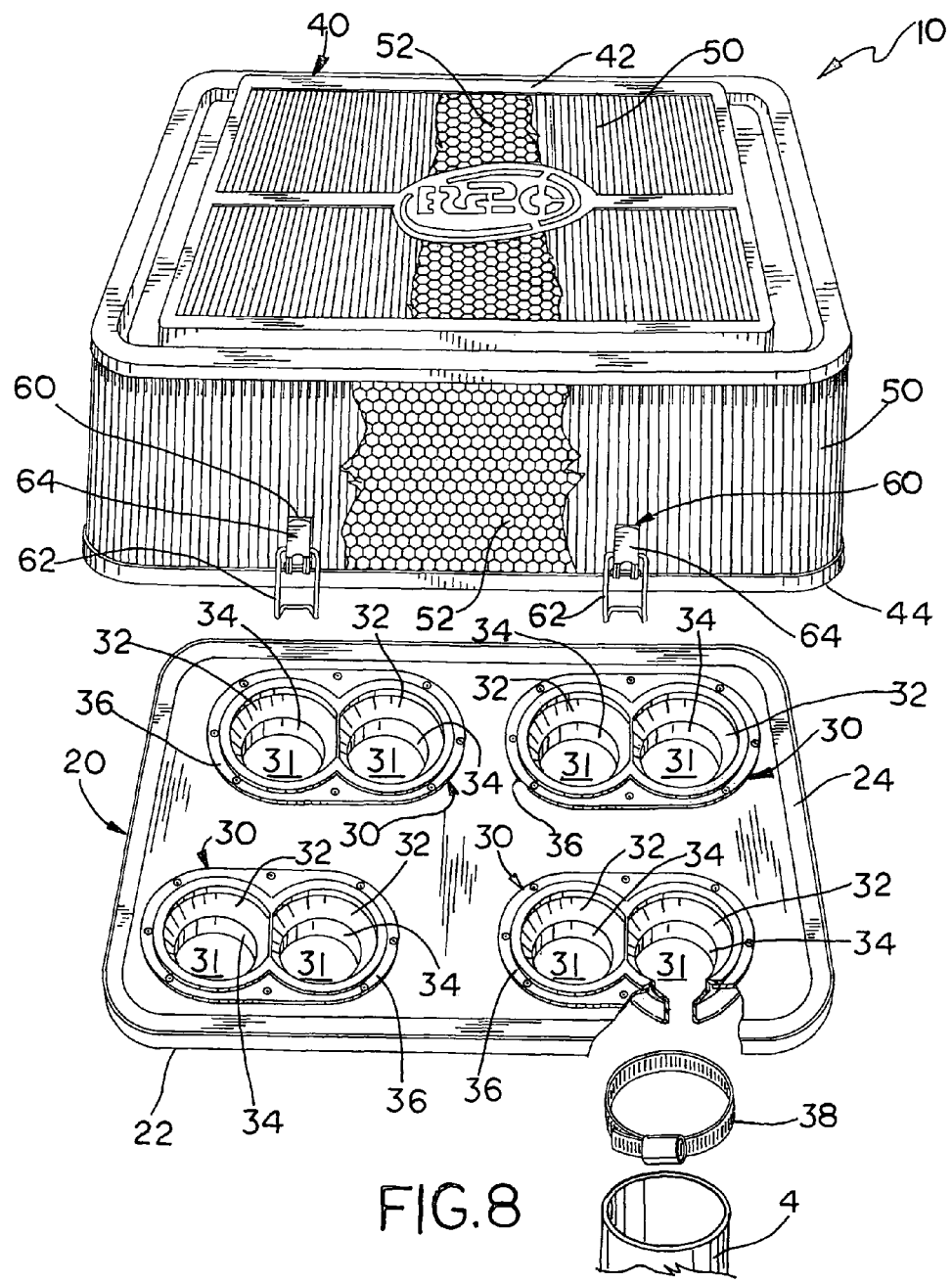
FIG. 8 is an exploded view of the air filter assembly of FIG. 1 and a single injector tube.

As shown in FIGS. 7 and 8, base tray 20 mounts directly to velocity stacks 4. Velocity stacks 4 extend up through stack ports 31 in mounting shoes 30 so that the top of the stacks will extend partially above base tray 20. Hose clamps 38 compress collars 24 snugly around each velocity stack 4 to hold base tray 20 to the stacks.

As shown, filter box 40 has a box shaped body with an open bottom. The body of filter box 40 is constructed of filter panels of pleated filter material 50 sandwiched between a metal screen 52, which are bonded to a carbon fiber top and bottom sub-frame members 42 and 44. Filter material 50 is composed of synthetic fibers rather than conventional paper, which allows filter box 40 to be cleaned with low pressure compressed air. Metal screen 52 is formed from a sheet of aluminum and has hexagonal openings that allow airflow through the filter material. As shown in FIG. 6, the ends of filter panels are seated in squared channels of sub-frame members 42 and 44. As shown in FIG. 6, bottom end member 44 has a protruding central rib 46 that extends around the peripheral bottom edge of filter box 40.

Filter box 40 is detachably secured to base tray 20 by quick release latches 60 (six shown), which allow the filter box to be readily fitted and removed from base tray 20. Each latch 60 includes a pivoting wire clasp member 62 and a locking lever 64. Locking lever 64 actuates clasp arm 62 in a "cam lock" action so that the clasp member under-hooks square shoulder 22 on the bottom of base tray 20 and securely holds filter box 40 against the base tray. When filter box 40 is fitted to base tray 20, bottom end member 48 seats within U-channel 21 of base tray 20 and rib 49 protrudes into and compresses gasket 24 to form a hermetic seal between the filter box and the base tray. When connected, filter box 40 and base tray 20 form an enclosed plenum area within which the tops of velocity stacks 4 partially extend.

It should be noted that base tray 20 can be configured to accommodate any particular size and arrangement of the velocity stacks within the teaching of this invention. The number, location, shape and configuration of the mounting shoes incorporated into the base tray are dictated by the style and arrangement of the velocity stacks for the particular fuel injection system on which air box 10 will be used. Consequently, mounting shoes 30 may be configured to have a single stack port or multiple stack ports depending on the styles or arrangement of velocity stacks of the particular fuel injection system. Likewise, the number and location of the tray opening within which the mounting shoes are seated is determined by the style and arrangement of the velocity stacks of the particular fuel injection system. While different base trays are used to accommodate the various style or arrangement of velocity stack, each different base tray is designed to accept a standardize filter box 40, although unique filter boxes can be used on differing base trays within the teachings of this invention.

One skilled in the art will note several advantages that the air box of this invention has over conventional air boxes. The air box of this invention mounts more securely and conveniently to the velocity stacks and ensures a more reliable hermetic seal between the base tray and velocity stacks. The base tray of this invention can be installed and uninstalled in minutes with simple tools. The use of pliable mounting shoes eliminates the need to manually cut holes in the base tray and to use messy and troublesome sealants to mount and seal the air box to the velocity stacks. The quick release latches that securely hold the filter box to the base tray allow the filter box to be removed from the base tray in seconds for cleaning or replacement. The quick release also eliminates the need for any tie-rod fasteners extending through the filter box or any other items that could loosen and be ingested by the engine.

The pliable mounting shoes, which are specifically configured to accommodate the particular velocity stack configuration and bonded to the base tray within predefined openings in the tray, provide a more reliable and resilient structural interface for mounting the base tray to the velocity stacks. Each velocity stack extends through an annular collar formed in the mounting shoe, which wraps physically around the velocity stack to provide a positive structural interface. The conventional hose clamps securely holds the collar to the stack and ensure a positive seal between the stacks and base tray as well as creating the holding force, which supports the base tray. The pliable mounting shoes also allow for slight misalignment of the velocity stacks. The bowl shaped depression of the mounting shoes from which the collar diverges helps isolate the base tray from stack vibrations. The reinforcement plate provides a more rigid structural interface for securing the pliable mounting shoes to the base tray, which prolongs the life of the air box, as wells as, improving the box's hermetic seal. The mounting shoes are specifically formed and molded to accommodate the particular style or configuration of velocity stacks, further ensuring a reliable seal and stable connection between the base tray and velocity stacks. The sides of the filter box nest within the peripheral channel of the base tray and the rib formed in the bottom end member of the filter box compresses the gasket seated in the channel, thereby sealing the plenum area of the air box.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. An air filter for a vehicle motor having a plurality of vertically protruding velocity stacks comprising:
   a base tray mountable to the plurality of velocity stacks; and
   a filter box detachably fitted to the base tray for filtering air therethrough,
   the base tray includes a plurality of pliable mounting shoes each having a port through which one of the plurality of velocity stacks extend when the base tray is mounted to the plurality of velocity stacks, and clamping means for securing each of the plurality of mounting shoes to the one of the plurality of velocity stacks, each of the plurality of mounting shoes has a second port therein through which a second of the plurality of velocity stacks extends.

2. The air filter of claim 1 wherein the port of each of the plurality of mounting shoes is defined in part by an annular collar.

3. The air filter of claim 2 wherein the clamping means includes a clamp that compress the annular collar of each of the plurality of mounting shoes around the one of the plurality of velocity stacks to hold the base tray to the plurality of velocity stacks.

4. The air filter of claim 1 wherein the port of each of the plurality of mounting shoes is defined in part by a bowl shaped depression in the one of the plurality of mounting shoes, the depression constitutes means for dampening vibration from the plurality of velocity stacks when the base tray is mounted to the plurality of velocity stacks.

5. The air filter of claim 1 wherein the base tray has a peripheral channel defined in the top thereof, the filter box seated within the peripheral channel of the base tray when the filter box is fitted to the base tray.

6. The air filter of claim 1 wherein the filter box includes a plurality of latches for securing the filter box to the base tray.

7. The air filter of claim 6 wherein the base tray includes a peripheral shoulder extending from the bottom thereof, each of the plurality of latches includes a clasp member, which engages the shoulder of the base tray to hold the filter box to the base tray.

8. The air filter of claim 1 wherein the second port of each of the plurality of mounting shoes is defined by a second annular collar, the clamping means includes a second clamp which compresses the second collar of each of the plurality of mounting shoes around the second of the plurality of velocity stacks when the base tray is mounted to the plurality of velocity stacks.

* * * * *